April 26, 1949. G. H. WOTRING 2,468,584
DISHWASHING APPARATUS
Filed May 23, 1946 7 Sheets-Sheet 4
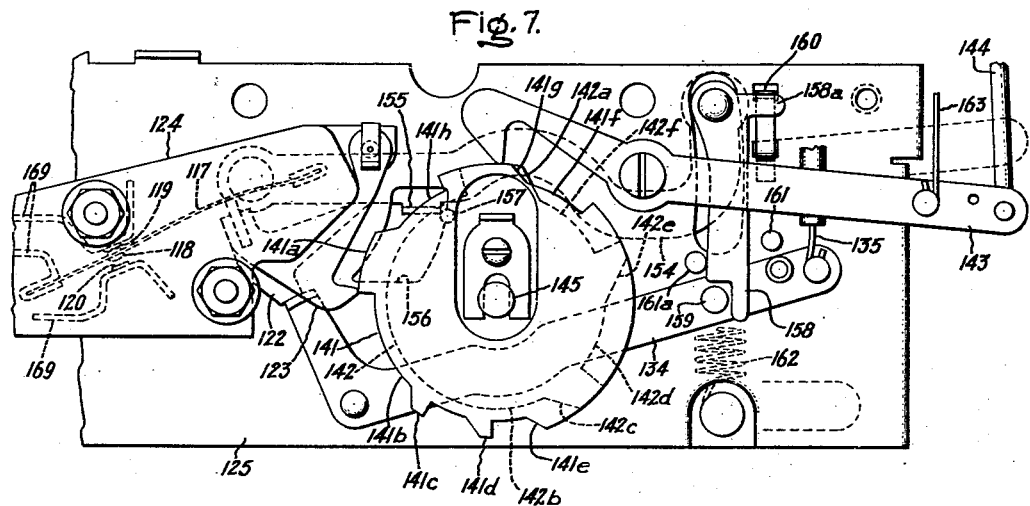
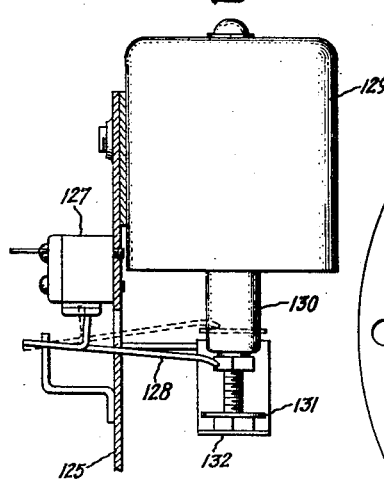
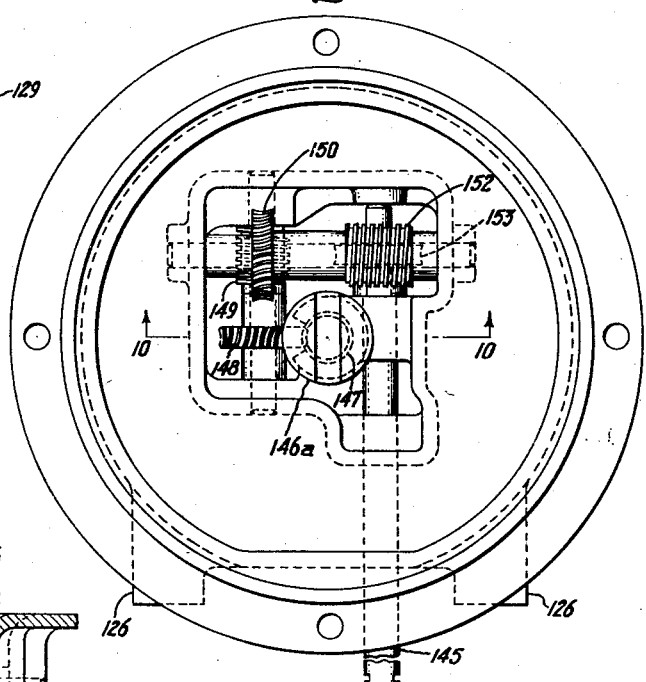
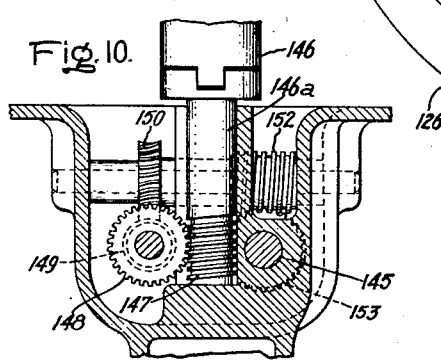
Inventor:
Gaylord H. Wotring,
by Alfred E. Bobst
His Attorney.

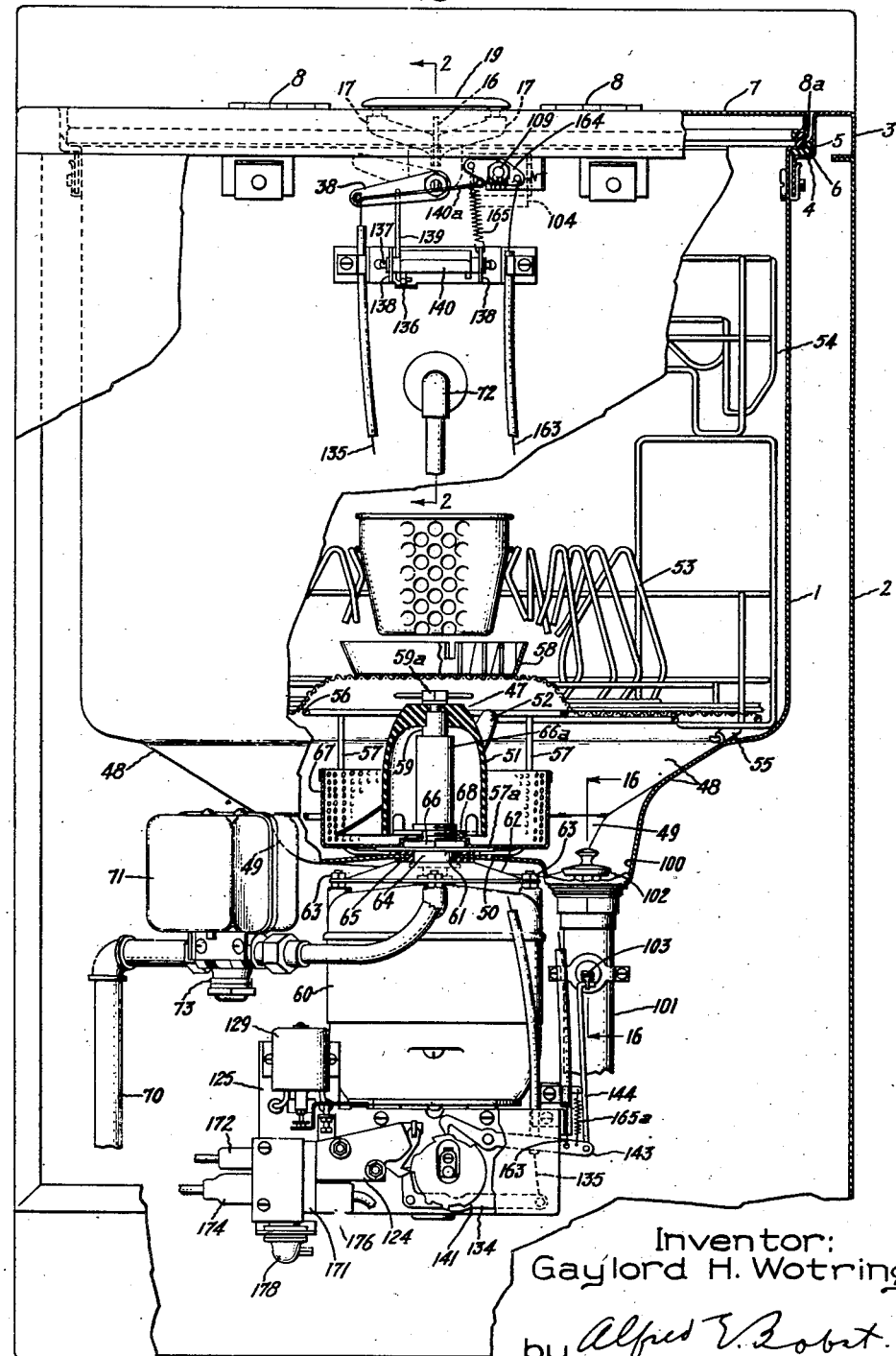

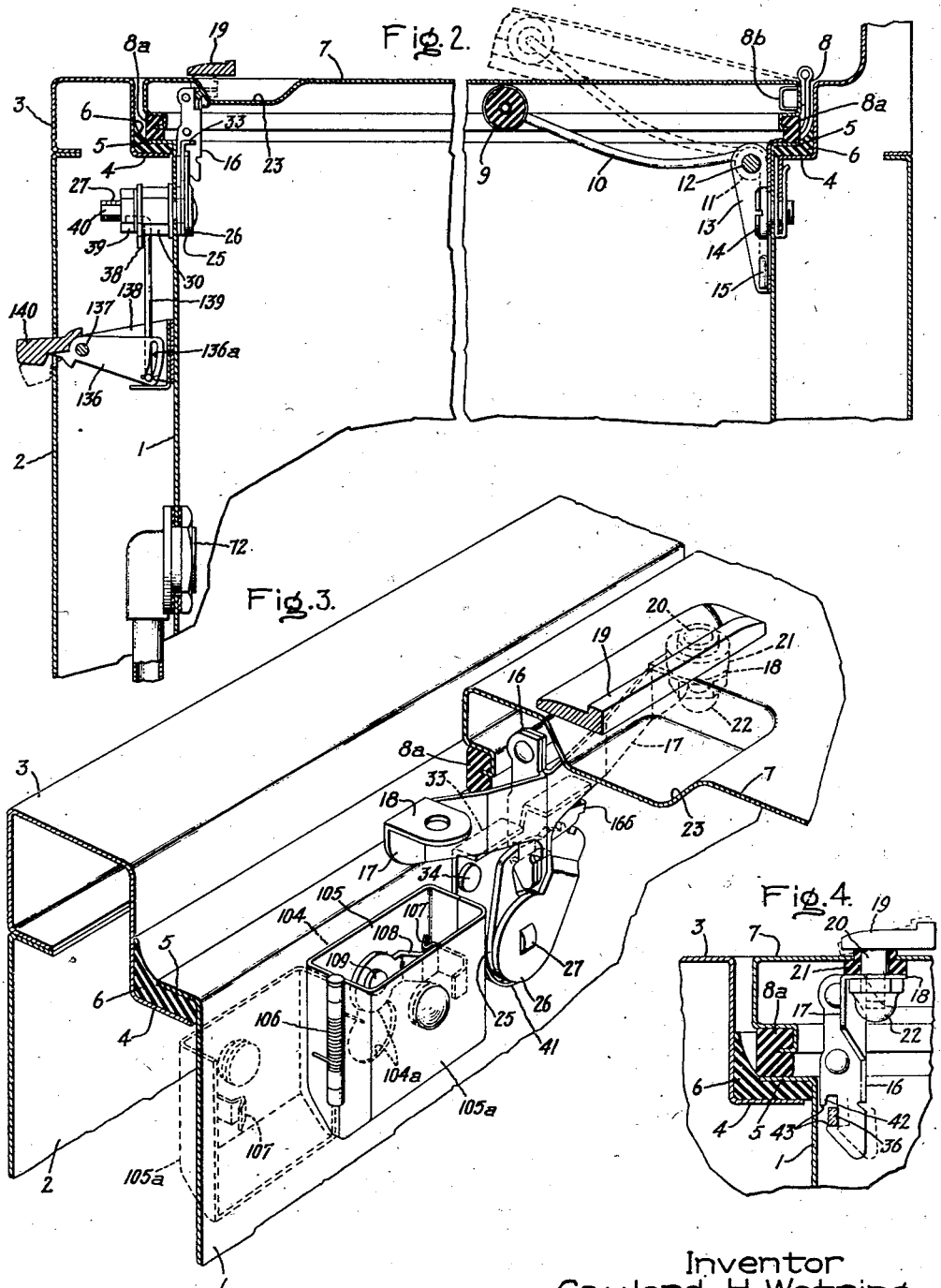

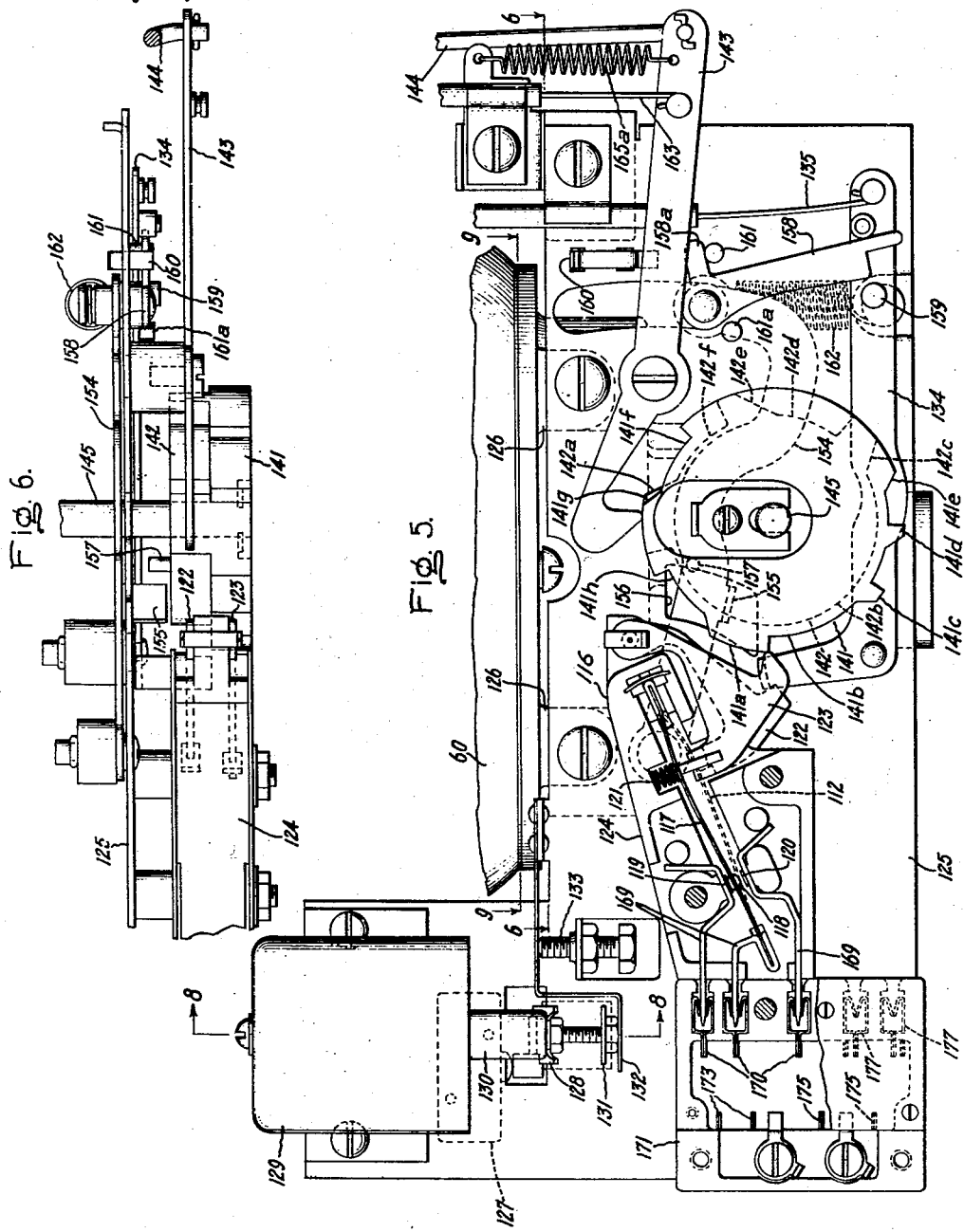

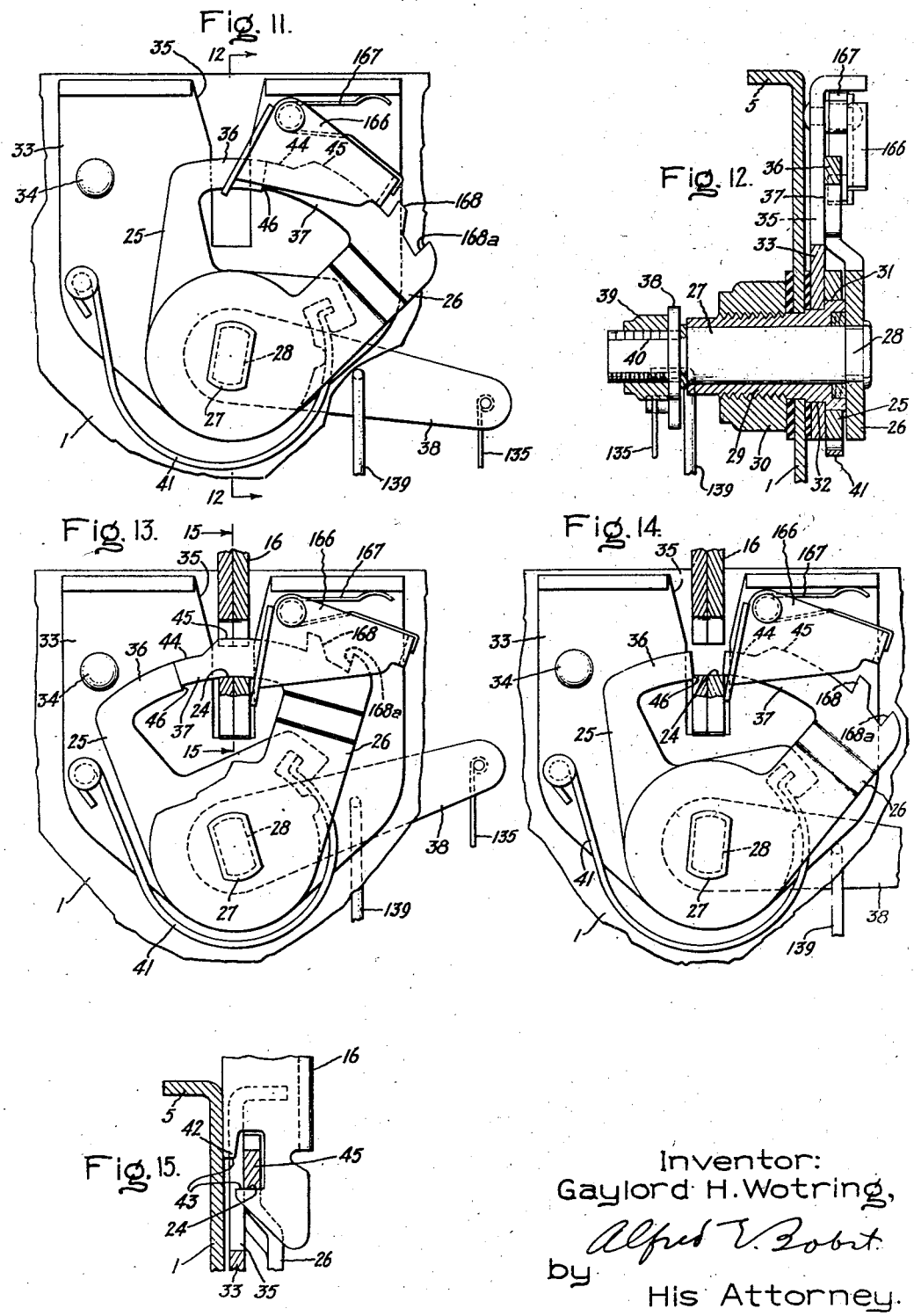

April 26, 1949.          G. H. WOTRING          2,468,584
DISHWASHING APPARATUS
Filed May 23, 1946                         7 Sheets-Sheet 6
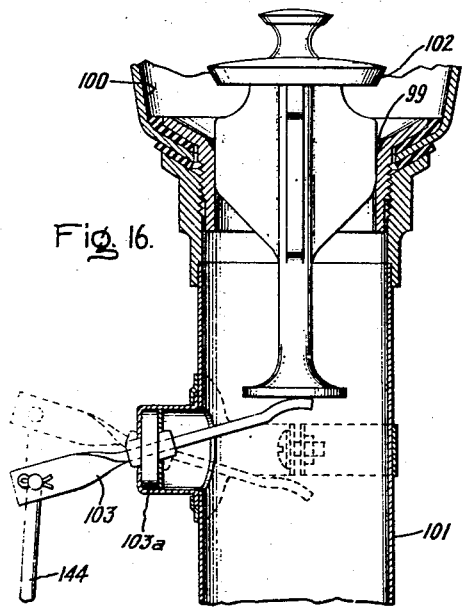
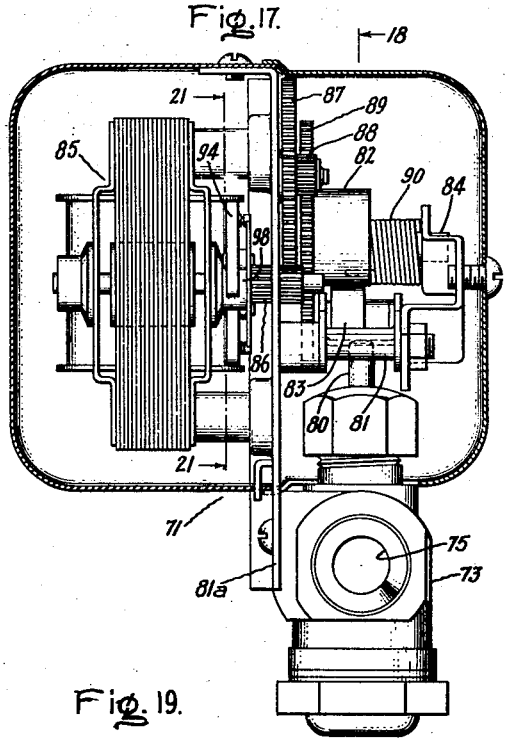
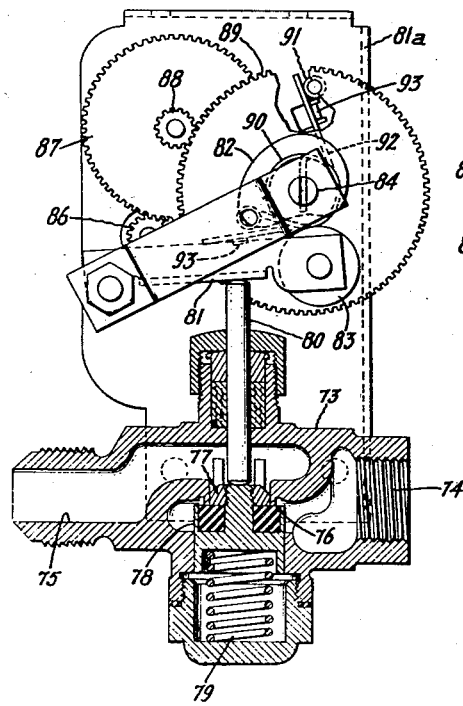
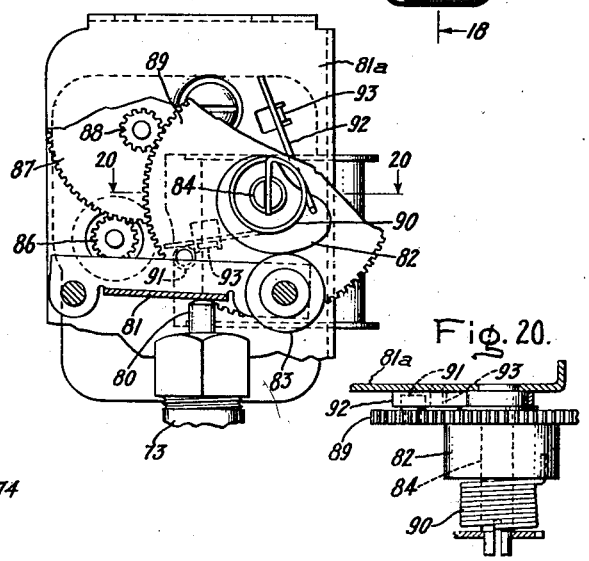
Inventor:
Gaylord H. Wotring,
by Alfred V. Bobst
His Attorney.

April 26, 1949.    G. H. WOTRING    2,468,584
DISHWASHING APPARATUS
Filed May 23, 1946    7 Sheets-Sheet 7
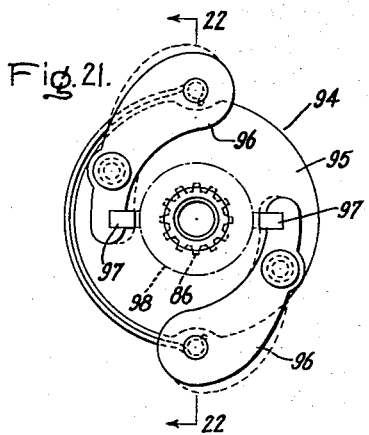
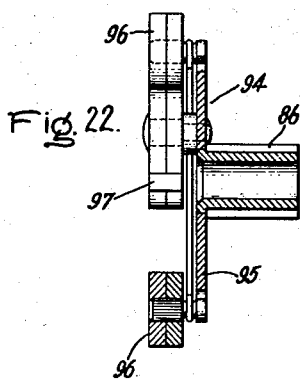
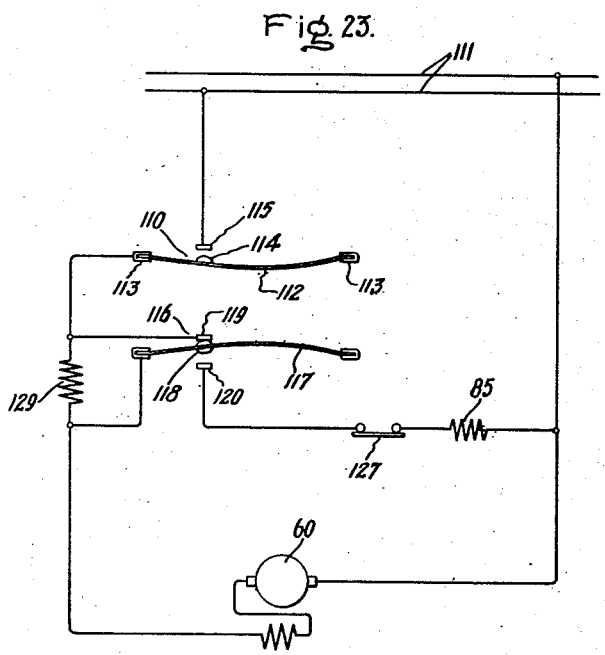
Inventor:
Gaylord H. Wotring,
by Alfred V. Robert.
His Attorney.

Patented Apr. 26, 1949

2,468,584

UNITED STATES PATENT OFFICE 2,468,584

DISHWASHING APPARATUS

Gaylord H. Wotring, Fairfield, Conn., assignor to General Electric Company, a corporation of New York Application May 23, 1946, Serial No. 671,822

11 Claims. (Cl. 134—57)

This invention relates to dishwashing apparatus, and it has for its object the provision of improved apparatus of this character for effecting the cleansing of dishes and the like in an automatic timed cycle, which includes both washing and rinsing steps, and means for automatically supplying the vat with the proper quantity of washing water.

More specifically, this invention contemplates the provision of dishwashing apparatus having means for starting the washing cycle by the operation of but a single manually operable control element. When operated, the machine starts, places the proper quantity of washing water in the vat, and washes and rinses. Means also are provided for opening the vat cover automatically at the end of the washing cycle so as to permit the dishes to dry; and for interlocking the cover and vat so as to prevent the opening of the cover while the machine is circulating the water in the vat to wash or rinse the dishes, but permitting it to be opened at all other times. The interlock means also prevents the operation of the machine to circulate water in the vat when the cover is open. And all of this in an improved, reliable, simple and inexpensive manner.

For a more complete understanding of this invention, reference should be had to the accompanying drawings in which Fig. 1 is a front elevation of dishwashing apparatus embodying this invention, parts being broken away and shown in section so as to illustrate certain details of construction; Fig. 2 is an enlarged sectional view taken through the line 2—2 of Fig. 1 and looking in the direction of the arrows; Fig. 3 is a fragmentary perspective view illustrating certain elements of the control for the washing apparatus, this figure being drawn to a larger scale than Figs. 1 and 2; Fig. 4 is an enlarged sectional view taken through a portion of the apparatus along the line 2—2 of Fig. 1; Fig. 5 is an enlarged front elevation view of a portion of the washing apparatus and more particularly illustrating certain control elements therefor; Fig. 6 is a sectional view taken through the line 6—6 of Fig. 5 and looking in the direction of the arrows; Fig. 7 is a fragmentary front elevation similar to Fig. 5 but illustrating certain of the controlling elements in a different operative position; Fig. 8 is a sectional view taken through the line 8—8 of Fig. 5 and looking in the direction of the arrows; Fig. 9 is a sectional view taken through the line 9—9 of Fig. 5 and looking in the direction of the arrows; Fig. 10 is a sectional view taken through the line 10—10 of Fig. 9 and looking in the direction of the arrows; Fig. 11 is a front elevation illustrating certain interlocking means between the washing vat and its cover, arranged in accordance with this invention; Fig. 12 is a sectional view taken through the line 12—12 of Fig. 11 and looking in the direction of the arrows; Figs. 13 and 14 are views similar to Fig. 11 but illustrating certain elements in different operative positions in the two views respectively; Fig. 15 is a sectional view taken through the line 15—15 of Fig. 13 and looking in the direction of the arrows; Fig. 16 is a sectional view taken through the line 16—16 of Fig. 1 and looking in the direction of the arrows, and the view being drawn to a larger scale than Fig. 1; Fig. 17 is a side elevation, partly in section illustrating the water inlet valve mechanism for supplying water to the vat; Fig. 18 is a sectional view taken through the line 18—18 of Fig. 17; Fig. 19 is a fragmentary view similar to Fig. 18 but illustrating certain elements in a different operative position; Fig. 20 is a sectional view taken through the line 20—20 of Fig. 19 and looking in the direction of the arrows; Fig. 21 is a sectional view taken through the line 21—21 of Fig. 17 and looking in the direction of the arrows; Fig. 22 is a sectional view taken through the line 22—22 of Fig. 21 and looking in the direction of the arrows; and Fig. 23 is a diagrammatic view illustrating the impeller driving motor together with certain other control elements embodied in this invention, and the electrical supply system therefor.

Referring to the drawings, this invention has been shown in one form as applied to dishwashing apparatus comprising an open-top washing vat 1 housed within and supported by a casing 2. This casing at its upper end carries a vat supporting member 3 which has an inturned flange 4 upon which the vat rests, the vat, as shown, having an out-turned flange 5 which overhangs flange 4. And interposed between these flanges is a flexible sealing member 6.

The open-top of the vat is provided with a cover 7 connected at its rear edge with the rear of the vat by means of hinge means 8. The cover is provided with a peripheral flexible sealing element 8a, and also with vents having metallic vent covers 8b (Fig. 2) in the rear side thereof. The cover may be swung up to a substantially vertical open position, and held there by any suitable well-known support bracket (not shown). Also it is biased to an intermediate open position, shown in dotted lines in Fig. 2, by means of a cover lift comprising a roller 9 mounted on the bight of a U-shaped spring 10 the two arms of which terminate in coiled springs 11. These springs are mounted on a rod 12 which in turn is mounted on a bracket 13. The bracket has an out-turned flange at the top, as shown, which lies on the vat top flange 5, and it has a keyway which "buttons on" a retaining screw 14. The two inner ends 15 of the coiled spring extend down the bracket and are fastened to it.

The cover 7 may be latched to prevent its upward movement by the cover lift by means of a latch 16 located inside the cover at the front and in the center thereof (Figs. 1, 2, 3 and 4). The latch is positioned in a generally vertical position in the vat when the cover is closed (Figs. 2, 3 and 4), and as shown most clearly in Fig. 3, and also in Figs. 13 and 14, is divided into two vertical parts, riveted together, and from the central sections of which two arms 17 extend outwardly and upwardly (Fig. 3) at right angles to the latch; the upper ends of arms 17 terminate in in-turned flanges 18. These flanges are secured to an actuator bar 19 located above the upper surface of the cover by means of rods 20 (Fig. 4) depending from the bar through apertures provided for them in the cover and in which relatively massive rubber bushings 21 are mounted to surround the rods; the bushings have lower heads, as shown, which engage the bottom surface of the cover; and the rods, bushings and flanges 18 are secured together by nuts 22 threaded on the lower ends of the rods. The rubber of which the bushings are made is fairly flexible so as to permit relative movement between the latch and cover for the purpose of permitting the latch to engage and disengage suitable locking mechanism to be described presently; in order to unlatch the cover, the bar 19 is elevated to dotted line position of Fig. 4; and the cover 7 is provided with a well 23 under the bar so that the fingers of the operator may be passed easily under the bar in order to elevate it.

The cover locking means coacting with the latch is best shown in Figs. 3, 4 and 11 to 15 both inclusive. It comprises a hook 24 formed on the lower ends of the riveted vertical flanges of the latch 16 and a pair of locking elements 25 and 26 for coacting with the hook. The element 26 is mounted upon a shaft 27 and is keyed to it by a key portion 28. The shaft 27 is journaled in a bushing 29 which is directed through an opening provided for it in the front wall of the vat, and which is rigidly secured thereto by a nut 30. The bushing inside of the vat is provided with a circular section 31 of larger diameter, and the lock element 25 is rotatably mounted upon it. Also the bushing is provided with a second circular section 32 of a diameter smaller than section 31 and upon which is mounted a plate 33, which is held in proper relation to the vat by a stud 34 which extends inward from the vat wall. This plate is provided with a vertical guideway 35 for guiding the latch 16 into its proper position for locking when the cover is closed.

The two locking elements 25 and 26 have locking fingers 36 and 37, respectively—both arc-shaped on the axis of the shaft 27 as a center. These two fingers are directed toward each other, and the upper end of locking element 26 is offset inwardly (Fig. 12) so that the ends of the two fingers are in alignment and may abut each other, as shown in Figs. 11 and 13. The locking element 26 is provided with an actuating lever 38 which is secured to the outer end of the shaft 27 by a nut 39 and by the keyed portion 40, while locking element 25 is free to rotate but is biased clockwise toward finger 26 so as to tend to follow it by means of a spring 41 having one end anchored to the plate 33, as shown, and its other end anchored to the locking element 25. The latch bar 16 has a part 42 (Figs. 4 and 15) depending in front of the hook opening, as shown, so as to narrow the entrance 43 to the hook. The vertical dimension of latch finger 36 is such that it will pass through this opening into the hook, as shown in Fig. 4. Lock element finger 37 has two sections 44 and 45, section 44 having its top edge curving into top of finger 36, while section 45 has its top edge materially elevated with respect to these top edges, as shown; the lower edge of sections 44 and 45 are elevated slightly above the lower edge of finger 36 so that when the fingers abut each other (Figs. 11 and 13) a depending shoulder 46 is formed by end of finger 36. In other words, the outer section 44 of locking element 26 is receivable in hook entrance 43, whereas inner section 45 will not pass through it (Fig. 15). Thus, the latch may freely engage either finger 36, or finger section 44 when either is positioned over guide slot 35 to latch the cover closed, or freely disengage either to unlatch the cover, but when the finger section 45 is within the hook the cover is locked shut and may not be unlatched.

The afore-described locking mechanism is controlled automatically as will be described hereinafter.

Referring back to Fig. 1, this washing apparatus further comprises an impeller 47 located in the lower part of the vat. The vat is rectangular in horizontal cross section, and as shown, is relatively deep, and at the bottom is provided with four downwardly and inwardly extending wall sections 48, which four sections merge into four more downwardly extending wall sections 49—almost but not quite vertical—and which are closed at the bottom by a slightly conical reentrant wall section 50—the wall sections 48, 49 and 50 forming the bottom wall of the vat. And the impeller, as shown, is mounted within this downwardly tapered bottom wall. It comprises an apron-like hub 51 upon the outer surface of which are a plurality of blades 52 which are shaped to engage water to hurl it upwardly and outwardly in the vat through suitable lower and upper open-work dish-supporting racks 53 and 54; rack 53 has outer legs 55 resting on bottom wall of the vat and is supported at the center by a wire ring 56 which in turn is supported by upright legs 57. The lower ends of these legs are attached to a plate 57a. Supported within the lower rack 53 is a water deflecting member 58.

The apron 51 of the impeller is mounted upon the upper end of a driving shaft 59, which shaft at its upper end is provided with a flattened section which is received in a complementary-shaped section in the apron so as to effect a keyed driving connection between these members. The impeller is further secured to the shaft by means of a wing screw 59a threaded into the upper end of the shaft.

The shaft 59 is the shaft of a suitable substantially constant speed electric driving motor 60 located under the bottom wall of the vat, this bottom wall having a central opening 61 through which the shaft passes. The motor is secured to an upwardly dished supporting plate 62 by means of screw fastening means 63, and plate 62 is fastened to the bottom wall of the vat by means of a bushing 64 flanged at the bottom and extending up through the opening 61. Inserted in the opening 61 around the bushing is a U-shaped rubber sealing ring 65 straddling the edge of the opening, as shown. The flange on the lower end of the bushing bears against the under side of the central portion of plate 62 which in turn bears against the bottom of this seal while the plate 57a bears against the upper side of the seal and this plate is solidly clamped by a nut 66 threaded upon the upper end of the bushing. By reason of this arrangement the entire motor and impeller assembly is secured to the bottom wall of the vat by means of the single nut 66.

The motor shaft 59 passes up through a cylindrical tube 66a which has it lower end brazed to the bushing 64 to make a water-tight connection with it. The static water level always is below the upper end of this tube.

Preferably, a circular pan-shaped screen 67 will be mounted on the plate 57a, so as to surround the impeller. This screen is secured by a wing nut 68 threaded on the bushing 64. The screen, which coacts with the vat bottom to prevent the recirculation of food particles by the impeller, is not a part of this invention but is the subject matter of the application of Forrest A. Walker, Serial No. 692,813, filed August 24, 1946, and which application is assigned to Hotpoint Inc., a wholly owned subsidiary of General Electric Company, the assignee of the instant application.

Water is supplied to the vat by a pipe 70 leading from a suitable source of hot water supply. Interposed in this pipe is a control valve 71; and the pipe terminates in a suitable spray device 72 (Fig. 2) which is mounted in the front wall of the vat and which sprays the incoming hot water throughout the vat. The inlet valve 71 is a motor-operated one and it is shown in detail in Figs. 17 to 22 inclusive. As shown in Fig. 18, the valve comprises a valve housing 73 having an inlet passage 74 and an outlet passage 75. Interposed between these passages is a replaceable valve seat washer 76 held in the valve piston 78 by a tapered valve pilot 77. The valve is biased closed by a compression spring 79. The valve is opened by a motor-driven plunger 80 which is operated directly by means of a lever 81 pivoted at one end to a base 81a which is fastened to the valve housing 73. This lever is operated from its position of Fig. 18 clockwise to its position of Fig. 19 to depress the plunger 80 to open the valve by a cam 82 which engages a roller 83 on the lever, as shown. This cam is mounted to rotate on a fixed shaft 84, shown most clearly in Fig. 20, and supported by plate 81a. This cam is driven by a suitable electric motor 85 mounted on the opposite side of the plate 81a and connected with the cam by means of a reduction gear train including gears 86, 87, 88 and 89. When the motor is energized, it drives the cam 82 clockwise (Figs. 18 and 19) to open the inlet valve, and when it is deenergized the cam is returned counterclockwise to permit the valve to close by means of a torsion spring 90 having one end anchored to the cam and its other end anchored to the fixed shaft 84. The motion of the cam 82 is limited to its valve-closed position of Fig. 18 and its valve-opened position of Fig. 19 by a stop pin 91 on gear 89 and which engages the two arms of a stop spring 92 in the two respective positions of the cam, which spring is mounted in abutments 93 provided for it on the plate 81a. The end movements of the cam in each direction is cushioned by the spring end leaving its abutment 93 somewhat.

The speed of the cam to its valve-opened and valve-closed positions is controlled by a governor 94 mounted on the motor shaft back of the base plate 81a, and shown in detail in Figs. 21 and 22. It comprises a disk-like supporting plate 95 rigidly fastened to the gear 86 for rotation by the motor shaft. On opposite sides of this plate are a pair of arms 96 pivoted intermediate their ends. The outer ends of the arms are weighted, as indicated, so as to swing outwardly by centrifugal force as the plate rotates; mounted on the inner ends of the arms are brake shoes 97 which, of course, move inwardly as the weights fly out. The shoes are arranged frictionally to engage the outer cylindrical surface of a bearing housing 98 provided for the motor shaft and thereby control the speed of the motor shaft.

The operation of the speed governor causes the valve to be opened and closed with smooth, steady motions. It thereby tends to eliminate water hammer. The valve pilot 77 assists in eliminating water hammer, as shown, it is tapered and thereby tends to gradually cut off the water supply.

Water is drained from the vat by a drain port 99 located in the lower end of a sump 100 and emptying into a drain pipe 101. The port is controlled by a drain valve 102 (Figs. 1 and 16), which valve is biased closed by its weight, and is opened by an actuating lever 103. Lever 103 is molded in a rubber member 103a which is a diaphragm washer making a water-tight seal for the lever where it enters the drain 101, as shown. This diaphragm, of course, permits deflection of the lever.

The washing apparatus further comprises means for supplying a detergent to the vat. The detergent device includes a detergent container 104 (Figs. 1 and 3) which is fastened to the inner surface of the front wall of the vat by key slot and key 104a. This container has a fixed back half 105 and a front half 105a hinged to it, and biased to its open position (shown in dotted lines in Fig. 3) by a torsion spring 106. The outer half is latched closed to complete the container by a spring catch 107 which engages a latch 108. This latch is rotatable on a shaft 109 counterclockwise from its latching position of Fig. 3 to a position where it releases the front half 105a. The two halves have downwardly inclined mating bottom walls, as shown, so that when the front half opens, all of the detergent in the container empties into the vat.

Suitable means are provided for automatically controlling the operation of the water inlet and drain valves and the detergent supply means so as to effect a timed automatic washing cycle, including means for supplying the proper amount of water to the vat, and for stopping the apparatus when the washing cycle has been completed; and further for controlling the operation of the interlock means between the vat and its cover.

The control means comprises a control switch 110 (Fig. 23) for the impeller motor 60 to control its energization from a suitable source of electrical supply 111 (Fig. 23). The switch, as shown, comprises a column spring 112 (Figs. 5 and 23) positioned in compression between two abutments 113, and which carries a contact 114 which coacts with a fixed contact 115. The column spring, when force is applied under it as viewed in Fig. 23, snaps up through a critical position to shut contacts 114 and 115 to energize the motor, whereas when it is snapped down it opens the contacts to deenergize the motor. The system also comprises a similar switch 116 having a column spring 117, but having thereon a double contact 118 for selectively engaging two spaced fixed contacts 119 and 120. This switch controls the water valve torque motor 85. Both switch column springs 112 and 117 are biased downward, as viewed in Fig. 23, by compressing springs 121 (that for switch 116 being shown in Fig. 5). These switch column springs are actuated upwardly by a pair of pivoted triggers 122 and 123, respectively. The switches are provided with a common housing 124 formed of a suitable electrically insulating material, such as molded phenol condensation product, and this housing also functions to pivotally support the triggers. The housing is mounted on a metallic control panel 125 attached to depending lugs 126 on motor 60 by screws, as shown.

The switches 110 and 116 and their associated housing and structure form no part of this invention, but constitute the subject matter of the copending application of H. L. Newell, Serial No. 665,501, filed April 27, 1946, and which application is assigned to the assignee of this application.

The water valve motor 85 is also controlled by an "on" and "off" switch 127 (Figs. 5, 8 and 23) which is biased closed, but which is opened to deenergize the motor and thereby shut off the water at the proper time by counterclockwise movement (Fig. 8) of an operating lever 128 which is moved by an electromagnet 129 (Figs. 1, 5, 8 and 23); and which when deenergized permits the switch to reclose; the magnet, as shown, has an armature 130 to which is attached a switch lever actuator 131 normally spaced below the magnet. When the magnet is electrically energized to a predetermined degree it retracts the armature to cause actuator 131 to engage switch lever 128 to elevate it to open the switch. A stop 132 is provided for the armature, and its position is adjustable by a screw 133.

The trigger 122 for switch 110 is controlled by a switch lever 134, roughly of L-shape, and pivoted at its apex to the panel 125. The long arm of the lever 134 is generally horizontal, while the short arm extends up to operate the trigger 122 to close the switch when the lever is moved counter-clockwise from its position of Fig. 5 to its position of Fig. 7. The lever is so moved by the lever 38 provided for the cover locking mechanism, and which is connected to the switch lever 134 by a wire cable 135. The lever 38, in turn, is operated by a lever 136 pivoted to a shaft 137 mounted in the two arms of a bracket 138 fastened to the outside of the front wall of the vat. The lever 136 is connected with lever 38 by a rod 139 which at its upper end is pivoted to the lever 38; the lower end of the rod is formed out at right angles to the rod and is received in an elongated slot 136a in lever 136. Lever 136 is provided with an operating knob 140 which projects through an opening provided for it in the front wall of casing 2 so as to be readily accessible.

It will be observed that when the knob 140 is depressed it will rotate lever 38 clockwise to elevate switch lever 134, and thereby cause trigger 122 to close switch 110. This operation, of course, starts the main impeller motor 60. An over-center spring toggle 140a is connected to lever 38 to hold it positively in its two positions.

The water valve switch 116 is controlled by means of a water cam 141, and the drain valve is controlled by a cam 142. These two cams preferably will be formed integrally with each other, and of a suitable phenol condensation product. The drain cam 142 operates the drain valve lever 103 through a lever 143 pivoted to the front wall of the panel 125, and the position of which is controlled by the cam, and a tie rod 144 connecting the two levers 103 and 143, as shown.

The two cams 141 and 142 are mounted for rotation on the front of the control panel, and are connected to a drive shaft 145 journaled in and directed back through the panel 125, as shown in Fig. 6. This shaft is driven from the motor 60 by a drive comprising shaft 146 (Fig. 10) driven by the motor and which is keyed (Fig. 10) to vertical shaft 146a which operates worm 147; this worm drives the worm wheel 148 and worm 149 which drives wheel 150, and worm 152; worm 152 drives worm wheel 153 which drives output shaft fo the gear drive which is the cam shaft 145. The gear reduction from the motor 60 (which operates at 1725 R. P. M.) to cam shaft is 18,000 to 1.

The control further comprises a shut-down lever 154 located back of control panel 125 and pivoted to the panel at its left-hand end (Figs. 5, 6 and 7). This lever, however, has a projection 155 extending forwardly through an opening 156 in the panel to the front side of the panel where it is engageable by a pin 157 fixed to the back of the cams, as more clearly shown in Fig. 6. This lever at its right-hand end is connected to operate a trigger 158 located in front of the panel and which coacts with a pin 159 on switch lever 134. The angular position of the trigger is controlled by two vertically spaced stops 160 and 161; stop 160, as shown is in the form of a cantilever spring, while stop 161 is a fixed pin. An additional stop pin 161a is provided to control the position of the trigger. Stop lever 154 is biased clockwise (Figs. 5 and 7) by a tension spring 162.

The drain valve lever 143 is also connected to the detergent device to operate it. As shown, it is connected with the detergent latch operating shaft 109 by means of a wire cable 163 and a lever 164 which is fixed to the shaft. This lever is biased counter-clockwise (Fig. 1) to tend to release the latch 108 by a spring 165 (Fig. 1); and a second spring 165a is connected to drain valve lever 143 to bias it up in order to apply the force to operate the drain valve to close.

The interlock means between the cover and vat also includes means preventing the depression of knob 140 to start the apparatus in the event the cover is open. This means comprises a dog 166 (Figs. 3, 11, 12, 13 and 14) pivoted to the cover guide plate 33. This dog is biased clockwise by spring 167 to engage an abutment 168 on lock element 26, as shown in Fig. 11, when the cover is open so as to prevent operation of the knob 140 to start the apparatus. A part of the dog projects into the guide slot 35 so that when the cover is closed this part is engaged by the latch to rotate dog counter-clockwise and thereby release the lock element 26, as shown in Fig. 13.

The switches 110 and 116, as previously pointed out, have a common housing 124. The contacts 118, 119 and 120 of switch 116 are connected to terminal pins 169 (Fig. 5) which are receivable in sockets 170 provided for them in an insulating housing 171. The water inlet valve is provided with a supply plug 172 (Fig. 1) which is insertable in terminals 173 (Fig. 5), while the motor 60 is provided with a plug 174 which is receivable in a pair of terminals 175 provided for them in housing 171. The solenoid 129 is provided with a supply plug 176 which is receivable in terminals 177 provided in the supply housing. The main power connection is made through a conduit 178 (Fig. 1) which enters the housing at the bottom.

The operation of the apparatus is as follows: It will be understood that at the start that when the machine is idle the various parts will be in their operative positions shown in Figs. 1-4 inclusive; that is, the system will be deenergized, the latching elements will be in their positions shown in Figs. 1, 3 and 4, and also in Fig. 11, and the cover will be closed with the latch hook 24 engaging the locking finger 36. Now if it is desired to wash dishes, the latch operator 19 will be operated counter-clockwise (Fig. 4) to its dotted line position, which operation will release the latch from the element 36 so as to permit the cover to be elevated to its open position. The dishes and utensils will then be loaded in the racks 53 and 54, the detergent loaded in its container 104, and the cover returned to its closed position. wherein the latch hook will snap over the locking finger 36. Then the operating knob 140 will be depressed. This operation will operate the lever 38 in a counter-clockwise direction from Fig. 11 to Fig. 13 which operation will move the large finger section 45 of locking element 26 into the hook 24 of the latch. This section will prevent the disengagement of the hook and thereby locks the cover closed. This operation of the lever 38 also will elevate the tie rod 135 so as to elevate the motor switch actuating lever clockwise from its "off" position of Fig. 5 to its "on" position of Fig. 7. This operates the dog 122 clockwise so as to cause the column switch 110 to close its contacts 114 and 115 so as to energize the impeller motor 60 through the switch 110 and the closed contacts 118 and 119 of the water valve switch 116, the motor 60 being energized by a circuit which for all practical purposes excludes the electromagnet 129 thereby preventing the armature from being retracted prematurely by the starting current of the motor. The impeller motor therefore starts to operate and as it does so it drives the cam shaft 145 at a greatly reduced speed. This shaft drives the cams in a clockwise direction, as viewed in Figs. 5 and 7. Shortly after the cams start to rotate, the water valve switch trigger 123 drops from cam lift 141a into the depression 141b. This operation causes the switch 116 to open its contact 119 and to close its contact 120. This operation completes an energizing circuit for the inlet valve motor 85 through the switch 116 and the normally closed switch 127 and at the same time causes all the current to pass through the coils of magnet 129. The motor 85 upon being energized functions to open the water valve and to permit water to spray into the vat through the spray device 72. At this time, the drain valve 102 is open so that the water sprayed into the vat flows out and into the drain pipe 101. This preliminary spray is for the purpose of spraying away certain of the larger soil particles from the dishes, and also it functions to heat the dishes up and also the vat so that during the subsequent washing operation the hot washing water is not unduly cooled.

As the cams continue to rotate, however, the cam lift 142a of the drain valve cam 142 leaves the lever 143 whereby it moves into the depression 142b of the cam 142 and permits the drain valve to close, the lever 143 being moved counter-clockwise to permit its action under the influence of the weight of the drain valve itself, and of the action of the tension spring 165 of the detergent operating means, and of spring 165a connected to drain lever 143. Also, at this time this operation of the lever 143 will cause the operation of the lever 164 of the detergent latch 108 so as to cause the detergent wall 105a to open and empty the detergent into the vat.

Now since the drain valve is closed and the inlet valve still open the water that is fed into the vat will collect therein, and as more and more water flows into the vat it will impose a greater and greater load upon the impeller motor 60. Eventually, when the proper quantity of water has been supplied—one gallon in the embodiment of the invention illustrated—the motor armature current will have risen to such a value that it will energize electromagnet 129 to retract its armature 130 and thereby open switch 127; this deenergizes the water valve motor 85 and thereby permits the valve to close. Here, it should be noted that adjustment screw 133 for the armature stop 132 will be set so that the switch 127 is operated only when the desired quantity of water is supplied to the vat. The current value at which the armature is retracted to shut off the water increases in proportion to the distance the armature projects out of the magnet. Each unit is further adjusted by screw 133 to shut off the water at a predetermined current value which the impeller motor draws when the desired quantity of water has been supplied.

The impeller motor 60 now functions violently to circulate the collected water up through the vat, upwardly and outwardly through the racks 53 and 54, so as to wash the utensils placed in them.

If during this washing operation, it is found to be necessary to open the vat to place additional dishes into it, the control knob 140 is elevated. The first motion of the lever 136 downwardly responsively to this elevation of the knob 140 merely absorbs the slot distance 136a. But eventually, the upper end of the slot will engage the lower end of the rod 139 to depress it. It will depress it, however, only far enough to depress the switch lever 134 sufficiently far to cause it to leave the dog 122 and thereby permit the switch 110 to open to deenergize the motor 60. At the same time, it will move the locking elements 25 and 26 clockwise from their position of Fig. 13 to an intermediate position wherein the section 44 of finger element 26 is brought into the hook 24. This section, as previously pointed out, will permit the release of the hook by moving its operator 19 upwardly whereby the cover may be opened. The cover is not released automatically at this time so as to prevent water being thrown out of the vat as the impeller coasts to rest after motor 60 is deenergized.

It will be understood that during this operation the inlet valve will remain closed and so will the drain valve so that the water which has been fed to the vat will be held therein. After the additional dishes have been placed into the vat the cover may be reclosed and the knob 140 again depressed so as to reclose the impeller motor switch 110 and thereby restart the cycle. Also, during this washing operation the water cam 141 causes two of its lifts 141c and 141d to engage the switch trigger 123 and successively operate the water switch 116 to momentarily close the contacts 118 and 119 thereby shorting out the water measuring electromagnet 129 and permitting switch 127 to reclose, and then reclose contacts 118 and 120. This operation successively energizes the valve motor 85 and electromagnet 129 for the purpose of automatically testing the quantity of water in the vat to be sure that the proper amount has been supplied. If upon such test, the proper quantity is not present the water valve motor 85 will, of course, open the water valve and permit it to stay open until the electromagnet 129 again functions to open the switch 127 and thereby shut the water valve.

The washing operation will continue until the drain valve lift 142c engages the lever 143 to move it clockwise to return to its position of Fig. 5 to open the drain valve and permit the vat to drain. Prior to this, however, a lift 141e of the inlet valve cam will have operated trigger 123 to operate switch 116 to close contacts 118 and 119 so as to again short the electromagnet 129 and permit the switch 127 to reclose in preparation for the rinsing operation. Following this, depression 141f of inlet valve cam will permit the inlet valve to open again by closing contact 120 so as to give the dishes a spray while the drain valve is open, and then depression 142d of the drain valve closes the drain valve so as to permit the water fed to the vat to collect therein, the system functioning to measure the predetermined quantity of water, as before, and to give the dishes a rinse without the addition of detergent. In the meantime, lift 141g of the supply valve again shorts out the water measuring electromagnet 129 to permit the switch 127 to close to condition it for a subsequent water measuring operation. Then lift 142e of the drain valve cam opens the drain valve and permits the vat to drain. Following this, depression 141h of the inlet valve operates to close switch contact 120 whereby the inlet valve opens and simultaneously therewith depression 142f of the drain valve causes the drain valve to close. The water is measured, as before, and a final rinse of the dishes is effected. In the meantime, inlet valve cam lift 141a will again short out the electromagnet 129 to permit the switch 127 to reclose. Following this, lift 142a of the drain valve causes the drain valve to open.

As the cams approach their starting position of Fig. 5, the pin 157 arranged on the rear of the cams will engage the forward extension 155 of the shut-off lever 154 so as to elevate it against the force of its spring 162. This operation of the lever 154 elevates the trigger 158. And as the pin 157 approaches its initial position the trigger arm 158a engages the spring stop 160, as shown in Fig. 7, whereby it moves clockwise to engage stop pin 161a. And as the pin 157 reaches its initial position (as shown in Fig. 7), it leaves the extension 155 and permits the shut-off lever 154 to be returned to its position of Fig. 5 by force of the extended spring 162. As it returns to this position the lower end of the trigger 158 engages the pin 159 on the motor switch start lever 134 and moves it clockwise from its position of Fig. 7 to its position of Fig. 5. This releases the trigger 122 and thereby permits the switch 110 to open. The parts are then in their initial condition and ready for a recycle of the washing apparatus.

Also, when the lever 134 returns to its initial position, it will be understood that it will have operated lever 38 to have moved the locking elements 25 and 26 clockwise from their position of Fig. 13 to their position of Fig. 14. As the finger 44 of locking element 26 moves to this position it moves out of the hook 24, as shown in Fig. 14, but the follownig finger 36 of element 25 can not move into the hook because of the shoulder 46 which engages the side of the hook, as shown in Fig. 14. Therefore, this separating movement of the fingers releases the cover latch 16 whereby the cover lift 9 elevates the cover to its open, dotted line position of Fig. 2. This vents the vat and permits the utensils therein to quickly dry under the influence of their residual heat. When the latch 16 is thus released the finger 35, of course, moves in to abut the finger 37 and the parts are in their condition of Fig. 11 ready for another washing operation.

It will be observed that when the parts are in this position of Fig. 11, the dog 166 engages the abutment 168 of the locking element 26, as shown, so as to prevent depression of the starting knob 140 to restart the cycle as long as the cover is open. When the cover is lowered, however, the latch 16 engages the dog so as to release the locking element 26 whereby the apparatus may be restarted. A second abutment 168a is provided on the locking element 26 for coacting with the dog when the machine is turned off manually, as explained previously, for example to insert more dishes after the machine has been started. Under such conditions, it will be remembered that element 26 is not rotated to its full "off" position of Fig. 11, but only to such a position that its section 44 is in the latch 16. When the machine is thus stopped manually and the cover opened, the dog by coacting with the second abutment 168a will prevent starting the apparatus until the cover is reclosed, which operation will release the element 26.

While I have shown and described a particular embodiment of my invention, it will be obvious to those skilled in the art that various changes and modifications may be made without departing from my invention in its broader aspects and I therefore aim in the appended claims to cover all such changes and modifications as fall within the true spirit and scope of my invention.

What I claim as new and desire to secure by Letters Patent of the United States is:

1. Dishwashing apparatus comprising a vat for receiving the dishes, a cover for said vat, means biasing said cover to an open position, latch means for said cover including a latch fastened to said cover and manually shiftable thereon to an unlatched position, locking means for said latch movable from one position wherein it holds said latch but permits its release by its manual shifting relative to said cover to its unlatching position to a second position in which it locks said latch to prevent manual release of said cover, and to still a third position in which it holds said latch to hold the cover closed but permits said manual shift thereof to release said cover, liquid supply and drain valves for said vat, a circulator for circulating liquid in said vat, control means for effecting the operation of said liquid supply and drain valves and said circulator in a predetermined sequence so as to effect a washing cycle, said control means including a control member connected with said locking means which member when operated from an "off" position operates said locking means to said second position and operates said control means to effect said washing cycle, said control means returning said locking means to said first position at the conclusion of said cycle, and said control member operable during said cycle to stop said circulator and to operate said locking means to said third position.

2. Dishwashing apparatus comprising a vat and a cover therefor, liquid supply and drain valves for said vat and a liquid circulator for circulating liquid in said vat, means biasing said cover to an open position, a latch for said cover shiftable from a locking to a release position, locking means for engaging said latch provided with a pair of movable elements, one an operating element which when moved in one direction moves the second with it and means biasing the second to follow the first when the first is moved in the opposite direction, said second element engaging said latch when in an "off" position, and the second holding said latch but permitting its manual release by manually shifting it to its release position, said second element movable from said "off" position by moving said one element in said one direction to a predetermined position in which the latter element engages said latch and prevents its manual movement to said release position, control means for operating said valves and said liquid circulator and also said locking means for effecting a washing cycle at the conclusion of which said one element is moved in the opposite direction to return it to its "off" position, said biasing means tending to move the second element to follow it, means stopping said second element temporarily so that said latch and cover are released by said locking means, and a control member for said means which when operated from an "off" position operates said one lock element from said "off" to said predetermined position and initiates the operation of said control means to effect said washing cycle.

3. Dishwashing apparatus comprising a vat and a cover therefor, liquid supply and drain valves for said vat and a liquid circulator for circulating liquid in said vat, means biasing said cover to an open position, a latch for said cover shiftable from a locking to a release position, locking means for engaging said latch provided with a pair of movable elements, one an operating element which when moved in one direction moves the second with it and means biasing the second to follow the first when the first is moved in the opposite direction, said second element engaging said latch when in an "off" position, and the second holding said latch but permitting its manual release by manually shifting it to its release position, and also said second element movable from said "off" position by moving said one element in said one direction to a predetermined position in which the latter element engages said latch and prevents its manual movement to said release position, control means for operating said valves and said liquid circulator and also said locking means for effecting a washing cycle at the conclusion of which said one element is moved in the opposite direction to return it to its "off" position, said biasing means tending to move the second element to follow it, means stopping said second element temporarily so that said latch and cover are released by said locking means, and a control member for said control means which when operated from an "off" position operates said one lock element from said "off" to said predetermined position and initiates the operation of said control means to effect said washing cycle, and said control member operable during the washing cycle to operate said one locking element from said predetermined position back toward its "off" position to an intermediate position, said element in said intermediate position holding said latch but permitting the manual release thereof, and said control element when so operated operating said control means to stop said circulator.

4. In dishwashing apparatus, a vat, a cover for said vat, means biasing said cover to an open position, locking means for said cover including a latch mounted thereon for manual movement from a latching to an unlatching position, a pair of lock elements for engaging said latch, the second when in an "off" position engaging said latch to hold the cover closed but permitting the manual movement of the latch to its unlatching position, and when moved from said "off" position disengaging said latch, and the first element movable from the "off" position to a predetermined position and when so moved engaging said second element to move it from said "off" position and also engaging said latch to prevent said manual movement to its unlatching position, and said first element when returned toward said "off" position to an intermediate position holding said latch but permitting its manual shift to its unlatching position, and means causing said second element to follow the first as it returns toward said "off" position.

5. In dishwashing apparatus, a vat, a cover for said vat, means biasing said cover to an open position, locking means for said cover including a latch mounted thereon for manual movement from a latching to an unlatching position, a pair of lock elements for engaging said latch, the second when in an "off" position engaging said latch to hold the cover closed but permitting the manual movement of the latch to its unlatching position, and when moved from said "off" position disengaging said latch, and the first element movable from the "off" position to a predetermined position and when so moved engaging said second element to move it from said "off" position and also engaging said latch to prevent said manual movement to its unlatching position, and said first element when returned toward said "off" position to an intermediate position holding said latch but permitting its manual shift to its unlatching position, and when moved on back to said "off" position disengaging said latch, means biasing said second element to follow said first as it returns toward said "off" position, and interengaging surfaces on said second element and said latch preventing the return movement of said second to its "off" position, whereby said cover is released to move to said open position and said surfaces are moved out of engagement to permit said second element to return to said "off" position.

6. In dishwashing apparatus, a vat, a water circulator in said vat, a motor for driving said circulator, a cover for said vat, means biasing said cover to an open position, locking means for said cover including a latch mounted thereon for manual movement from a latching to an unlatching position, a pair of lock elements for engaging said latch, the second element when in an "off" position holding the cover closed but permitting the manual movement of the latch to its unlatching position to release the cover, and when moved from said "off" position disengaging said latch, and the first element movable from the "off" position to a predetermined position and when so moved engaging said second element to move it from said "off" position and also engaging said latch to prevent said manual movement thereof to its unlatching position, a manually operable control element for said first element for moving it from said "off" to said predetermined position, a control switch for said motor connected to said control element so as to be operated to energize said motor when said first lock element is moved to said predetermined position, and a dog for engaging said first element to prevent the operation of said control element to move said first lock element from its "off" position when the cover is open, but operated by said latch when the cover is closed to disengage said first lock element.

7. In dishwashing apparatus, a vat, a water circulator in said vat, a motor for driving said circulator, a cover for said vat, means biasing said cover to an open position, locking means for said cover including a latch mounted thereon for manual movement from a latching to an unlatching position, a pair of lock elements for engaging said latch, the second when in an "off" position engaging said latch to hold the cover closed but permitting the manual movement of the latch to its unlatching position, and when moved from said "off" position disengaging said latch, and the first lock element movable from the "off" position to a predetermined position and when so moved engaging said second element to move it from said "off" position and also engaging said latch to prevent said manual movement to its unlatching position, and said first element when returned toward said "off" position to an intermediate position holding said latch to hold the cover closed but permitting the manual shift of the latch to its unlatching position, a manually operable control element for said first lock element, a control switch for said motor operated by said control element so that when it moves said first lock element to said predetermined position said switch energizes said motor, and when moved to said intermediate position deenergizes said motor, and a dog for engaging said first lock element to prevent the operation of said control element to move the lock element from its "off" position when the cover is open, but operated by said latch when the cover is closed to release said first element.

8. Dishwashing apparatus comprising a vat, a cover for said vat biased to an open position, liquid supply and drain valves for said vat, a liquid circulator for said vat, a motor, means operated by said motor for controlling the operation of said liquid supply and drain valves and said impeller so as to effect a washing cycle as said motor operates, a switch for controlling said motor operable to "on" and "off" positions to energize said motor to start the washing cycle and to deenergize it to stop the washing cycle, shut-off means for operating said switch to said "off" position responsively to the operation of said motor thereby automatically to terminate said washing cycle, a manually operable member, connection means between said member and said switch for operating said switch to said "on" position to start said motor and thereby initiate said washing cycle, and thereafter for operating it to said "off" position to stop said washing cycle and back to said "on" position to resume said cycle at any time during said cycle and until said shut-off means operates said switch to said "off" position to terminate said cycle, a latch for said cover manually shiftable to an unlatching position, locking means for said latch movable from a first position, wherein it holds said latch but permits its release by its manual shift to its unlatching position, to a second position in which it locks said latch to prevent manual release of said cover, and to still a third position in which it holds said latch to hold said cover closed but permits said manual shift thereof to release said cover, and a connection between said locking means and said connection means for operating said locking means from said first position to said second position when said manually operable member operates said switch to said "on" position, and thereafter when said manually operable member operates said switch to said "off" position during said cycle operates said locking means to said third position, said locking means being operated by said connection means back to said first position when said switch is operated automatically to said "off" position by said shut-off means, and said locking means when thus operated toward said first position releasing said cover so that it moves to said open position by said biasing means.

9. Washing apparatus comprising a vat, an impeller for circulating liquid in said vat, a motor for driving said impeller, water supply and drain valves for said vat, means for controlling the water supply valve responsively to the load imposed on said motor by said impeller as it circulates water in said vat so as to shut off the supply of water to said vat when said load attains a predetermined magnitude, and means thereafter causing said control means periodically to respond to the load on said motor so as to open said supply valve in the event the desired quantity is not present in said vat, and to reclose it when said quantity has been supplied.

10. Dishwashing apparatus comprising a vat, a cover for said vat movable to closed and open positions, biasing means for said cover biasing it from said closed position, liquid supply and drain valves for said vat, motor timer means controlling said valves so as to effect a washing cycle, a manually operable control member for said motor timer means movable from an "off" position to an "on" position wherein it energizes said motor timer means to start said washing cycle, said control member being retractable to an intermediate position wherein it deenergizes said motor timer means to stop the washing cycle, interlock means between said cover and said vat controlled by said control member to lock said cover closed when said control member is operated from said "off" position to energize said motor timer means and operable when said motor means is retracted to said intermediate position to hold said cover closed, manually operable means associated with said interlock means for releasing said means when said control member is in said intermediate position, and means operated by said motor timer means controlling said interlock means automatically to release said cover at the end of the washing cycle in order to permit said biasing means to move said cover from its closed position.

11. Dishwashing apparatus comprising a vat, liquid supply and drain valves for said vat, a liquid circulator for said vat, a motor for driving said circulator, a switch controlling said motor, a control member manually operable from an "off" position to an "on" position for operating said switch to energize said motor, cam means driven by said motor for controlling the operation of said valves, a trigger normally in an inoperative position with respect to said control member so that said member can be operated from said "off" to said "on" position to start said motor and returned toward said "off" position to stop said motor independently of said trigger, said trigger operated by said motor to an operative position from which it is movable to engage said control member to return it to said "off" position, spring means for operating said trigger from said operative position to retract said control member to said "off" position when said trigger is released, means controlled by said cam means for releasing said trigger to move from said operative position, and means engageable with said trigger for operating it out of engagement with said control member as said member returns to said "off" position.

GAYLORD H. WOTRING.

REFERENCES CITED

The following references are of record in the file of this patent:

UNITED STATES PATENTS

| Number | Name | Date |
|---|---|---|
| 1,670,611 | Couch | May 22, 1928 |
| 2,200,127 | Stoddard et al. | May 7, 1940 |
| 2,314,332 | Ferris | Mar. 23, 1943 |
| 2,390,757 | Voris | Dec. 11, 1945 |
| 2,425,520 | Kempton | Aug. 12, 1947 |